(12) United States Patent
Holz et al.

(10) Patent No.: US 11,386,711 B2
(45) Date of Patent: Jul. 12, 2022

(54) AUTOMOTIVE AND INDUSTRIAL MOTION SENSORY DEVICE

(71) Applicant: ULTRAHAPTICS IP TWO LIMITED, Bristol (GB)

(72) Inventors: David S. Holz, San Francisco, CA (US); Justin Schunick, Oakland, CA (US); Neeloy Roy, San Francisco, CA (US); Chen Zheng, San Francisco, CA (US); Ward Travis, San Mateo, CA (US)

(73) Assignee: ULTRAHAPTICS IP TWO LIMITED, Bristol (GB)

( * ) Notice: Subject to any disclaimer, the term of this patent is extended or adjusted under 35 U.S.C. 154(b) by 0 days.

(21) Appl. No.: 14/826,102

(22) Filed: Aug. 13, 2015

(65) Prior Publication Data
US 2016/0048725 A1 Feb. 18, 2016

Related U.S. Application Data

(60) Provisional application No. 62/038,112, filed on Aug. 15, 2014.

(51) Int. Cl.
| | |
|---|---|
| *G06F 3/01* | (2006.01) |
| *G06V 40/20* | (2022.01) |
| *G06F 3/042* | (2006.01) |
| *G01P 13/00* | (2006.01) |
| *G06T 7/70* | (2017.01) |
| *G06V 20/59* | (2022.01) |
| *G06T 7/20* | (2017.01) |
| *H04N 5/33* | (2006.01) |
| *H04N 7/18* | (2006.01) |

(52) U.S. Cl.
CPC .............. *G06V 40/20* (2022.01); *G01P 13/00* (2013.01); *G06F 3/01* (2013.01); *G06F 3/011* (2013.01); *G06F 3/017* (2013.01); *G06F 3/042* (2013.01); *G06T 7/20* (2013.01); *G06T 7/70* (2017.01); *G06V 20/59* (2022.01); *H04N 5/332* (2013.01); *H04N 7/181* (2013.01); *G06T 2207/10012* (2013.01); *G06T 2207/10024* (2013.01); *G06T 2207/10048* (2013.01); *G06T 2207/30196* (2013.01); *G06T 2207/30268* (2013.01)

(58) Field of Classification Search
CPC ....................................................... G06F 3/011
See application file for complete search history.

(56) References Cited

U.S. PATENT DOCUMENTS

| | | |
|---|---|---|
| 7,050,606 B2 | 5/2006 | Paul et al. |
| 7,289,645 B2 | 10/2007 | Yamamoto et al. |

(Continued)

OTHER PUBLICATIONS

CN 2014205211324, Office Action 1, dated Nov. 20, 2014, 10 pages.

(Continued)

*Primary Examiner* — William Boddie
*Assistant Examiner* — Andrew B Schnirel
(74) *Attorney, Agent, or Firm* — Haynes Beffel & Wolfeld LLP; Andrew Dunlap; Franklin M. Schellenberg

(57) ABSTRACT

The technology disclosed relates to highly functional/highly accurate motion sensory control devices for use in automotive and industrial control systems capable of capturing and providing images to motion capture systems that detect gestures in a three dimensional (3D) sensory space.

13 Claims, 5 Drawing Sheets

(56) References Cited

U.S. PATENT DOCUMENTS

| | | |
|---|---|---|
| 7,454,136 B2 | 11/2008 | Raskar et al. |
| 8,396,252 B2 | 3/2013 | El Dokor |
| 8,744,645 B1 | 6/2014 | Vaghefinazari et al. |
| 8,781,171 B2 | 7/2014 | King et al. |
| 8,942,881 B2 | 1/2015 | Hobbs et al. |
| 9,063,574 B1 | 6/2015 | Ivanchenko |
| 9,477,314 B2 | 10/2016 | Alameh et al. |
| 10,353,532 B1* | 7/2019 | Holz .................. G06F 3/04815 |
| 2002/0140633 A1* | 10/2002 | Rafii ...................... B60K 35/00 345/8 |
| 2005/0063564 A1 | 3/2005 | Yamamoto et al. |
| 2007/0025717 A1 | 2/2007 | Raskar et al. |
| 2008/0043108 A1 | 2/2008 | Jung et al. |
| 2009/0073275 A1 | 3/2009 | Awazu |
| 2009/0167682 A1* | 7/2009 | Yamashita ............. G01C 21/36 345/158 |
| 2009/0235313 A1* | 9/2009 | Maruyama ......... H04N 21/4668 725/46 |
| 2009/0278915 A1 | 11/2009 | Kramer et al. |
| 2010/0013613 A1* | 1/2010 | Weston ................. G06F 3/016 340/407.2 |
| 2010/0205541 A1* | 8/2010 | Rapaport ............ G06F 16/285 715/753 |
| 2011/0124977 A1* | 5/2011 | Winarski ................ G06F 3/015 600/301 |
| 2012/0041344 A1* | 2/2012 | Flodmark ............ A61B 5/0064 600/587 |
| 2013/0156296 A1 | 6/2013 | El Dokor |
| 2013/0182077 A1 | 7/2013 | Holz |
| 2013/0182246 A1 | 7/2013 | Tanase |
| 2013/0182902 A1 | 7/2013 | Holz |
| 2013/0204457 A1 | 8/2013 | King et al. |
| 2013/0229508 A1* | 9/2013 | Li .......................... G06F 1/3287 348/77 |
| 2013/0261871 A1 | 10/2013 | Hobbs et al. |
| 2013/0271370 A1 | 10/2013 | Wang et al. |
| 2013/0329015 A1 | 12/2013 | Pulli et al. |
| 2014/0028861 A1* | 1/2014 | Holz .................. H04N 5/23277 348/208.4 |
| 2014/0099019 A1 | 4/2014 | El Dokor |
| 2014/0104463 A1* | 4/2014 | Spears ................... G06F 3/042 348/263 |
| 2014/0118257 A1 | 5/2014 | Baldwin |
| 2014/0201666 A1 | 7/2014 | Bedikian et al. |
| 2014/0267666 A1* | 9/2014 | Holz ........................ G06T 7/30 348/77 |
| 2014/0309813 A1* | 10/2014 | Ricci ...................... B60Q 1/00 701/2 |
| 2015/0016777 A1 | 1/2015 | Abovitz et al. |
| 2015/0049017 A1 | 2/2015 | Weber et al. |
| 2015/0145656 A1* | 5/2015 | Levesque ................ G06F 1/163 340/407.1 |
| 2015/0154035 A1* | 6/2015 | Zepeniuk ............... G06F 3/038 715/762 |
| 2015/0199025 A1 | 7/2015 | Holz |
| 2015/0211919 A1 | 7/2015 | Julian et al. |
| 2015/0227210 A1 | 8/2015 | Chen et al. |
| 2015/0332475 A1 | 11/2015 | Shroff et al. |
| 2016/0077547 A1* | 3/2016 | Aimone ............... A61B 5/6814 345/8 |
| 2016/0239080 A1 | 8/2016 | Marcolina et al. |
| 2016/0239624 A1* | 8/2016 | Short ..................... G16H 20/00 |
| 2019/0391824 A1* | 12/2019 | Hung .................. G06F 9/44578 |

OTHER PUBLICATIONS

CN 2014205211324, Response to Office Action 1, dated Nov. 20, 2014, 35 pages.
CN 2014205211324, Office Action 2, dated Feb. 17, 2015, 6 pages.
CN 2014205211324, Response to Office Action 2, dated Feb. 17, 2015, 12 pages.
CN 2014205211324, Notice of Allowance, dated May 14, 2015, 3 pages.
DE 20-2014-104297.0, Office Action 1, dated Nov. 11, 2014, 4 pages.
DE 20-2014-104297.0, Response Office Action 1, dated Nov. 11, 2014, 5 pages.
U.S. Appl. No. 14/725,510—Office Action dated Feb. 27, 2017, 33 pages.
U.S. Appl. No. 14/725,510—Response to Office Action dated Feb. 27, 2017 filed Jul. 11, 2017, 9 pages.
U.S. Appl. No. 14/725,510—Notice of Allowance dated Sep. 8, 2017, 10 pages.

* cited by examiner

AUTOMOTIVE AND INDUSTRIAL MOTION SENSORY DEVICE

CROSS-REFERENCE TO OTHER APPLICATIONS

This application claims the benefit of U.S. Provisional Patent Application No. 62/038,112, entitled "AUTOMOTIVE AND INDUSTRIAL MOTION SENSORY DEVICE", filed 15 Aug. 2014, the disclosure of which is incorporated by reference.

TECHNICAL FIELD

The technology disclosed relates to highly functional/ highly accurate motion sensory control devices capable of capturing and providing images to motion capture systems that detect gestures in a three dimensional (3D) sensory space for use in automotive and industrial control systems.

BACKGROUND

The first dashboard consisted of a board placed in front of the driver of a carriage to shield from debris cast off the horses' hooves. As vehicles became more complex, and mechanical motive power supplanted the horse, controls for various systems (environmental, safety, entertainment and so forth) proliferated. The dashboard was retained as a convenient place for various controls. The operator's attention must be removed from the road (or runway, rail or sea-lane) to "hunt" for the knob or switch, hopefully labelled in his or her own language. In the 1970s, replacing English language labels with international symbols made the dashboard equally unintelligible to everyone everywhere. The need for a more simplified interface became apparent and joysticks, keyboards or keypads, glass cockpits, and so forth were pressed into service. But complexity—and confusion—proliferated.

Some have looked to capturing motions of the operator's hands (gestures) and interpreting the motions to provide commands. Some rudimentary efforts by SoftKinetic and others include inferring motion from shadows passing over simple photo-detector sensors. Unfortunately, such systems tend to be prone to false positives. The sensor cannot discriminate between the operator's hand and the wagging of the tail of the family dog. Changing and uncontrollable lighting situations, background objects, glare, reflections and so forth pose further challenges to the use of optical components. To date, such considerations have limited the deployment and use of motion capture technology in the vehicle cabin to little more than non-functional pipe dreams.

SUMMARY

Implementations of the technology disclosed address these and other problems by providing an embeddable motion sensory control device capable of acquiring imaging information of a scene and providing at least a near real time (i.e., sufficiently fast that any residual lag between the scene change and the system's response is unnoticeable or practically insignificant) stream of imaging information to a motion capture or image analyzer that detects gestures in a three dimensional (3D) sensory space, interprets the gesture as a command to a system or machine under control, and issuing the command when appropriate. The device can be embedded in a wide variety of machines or systems.

In a representative implementation, an embeddable motion sensory control device is provided that includes a plurality of imaging sensors arranged on a first portion that provide stereoscopic imaging information for a scene being viewed. One or more illumination sources arranged on a second portion are also included. A controller is coupled to the imaging sensors and illumination sources to control operation thereof, acquiring imaging information of a scene, and providing at least a near real time stream of the imaging information to a system or device under control.

Advantageously, some implementations can provide improved user experience, greater safety and improved functionality. Some implementations can enable motion capture or image analysis systems to recognize gestures, thereby enabling an operator to control a device or system, such as a vehicle or vehicle subsystem, by intuitive gesture sets. Some implementations can provide improved interfacing and/or control with a variety of machines (e.g., aircraft or automobiles, trains, planes, fork lifts, ships and so forth) for example. Devices can be embedded within the machine under control and can work cooperatively with a proxy or supporting device (smart telephones, portable computing systems, including laptop, tablet computing devices, personal data assistants, special purpose visualization computing machinery, including heads up displays (HUD), wearable virtual and/or augmented reality systems, including Google Glass, and others, graphics processors, embedded microcontrollers, gaming consoles, or the like; wired or wirelessly coupled networks of one or more of the foregoing, and/or combinations thereof). Device implementation can obviate or reduce the need for contact-based input devices such as a mouse, joystick, touch pad, or touch screen. Some implementations can provide for improved interface with computing and/or other machinery than would be possible with heretofore known techniques. In some implementations, a richer human-machine interface experience can be provided.

Other aspects and advantages of the present technology can be seen on review of the drawings, the detailed description and the claims, which follow.

DESCRIPTION

Figure 1:
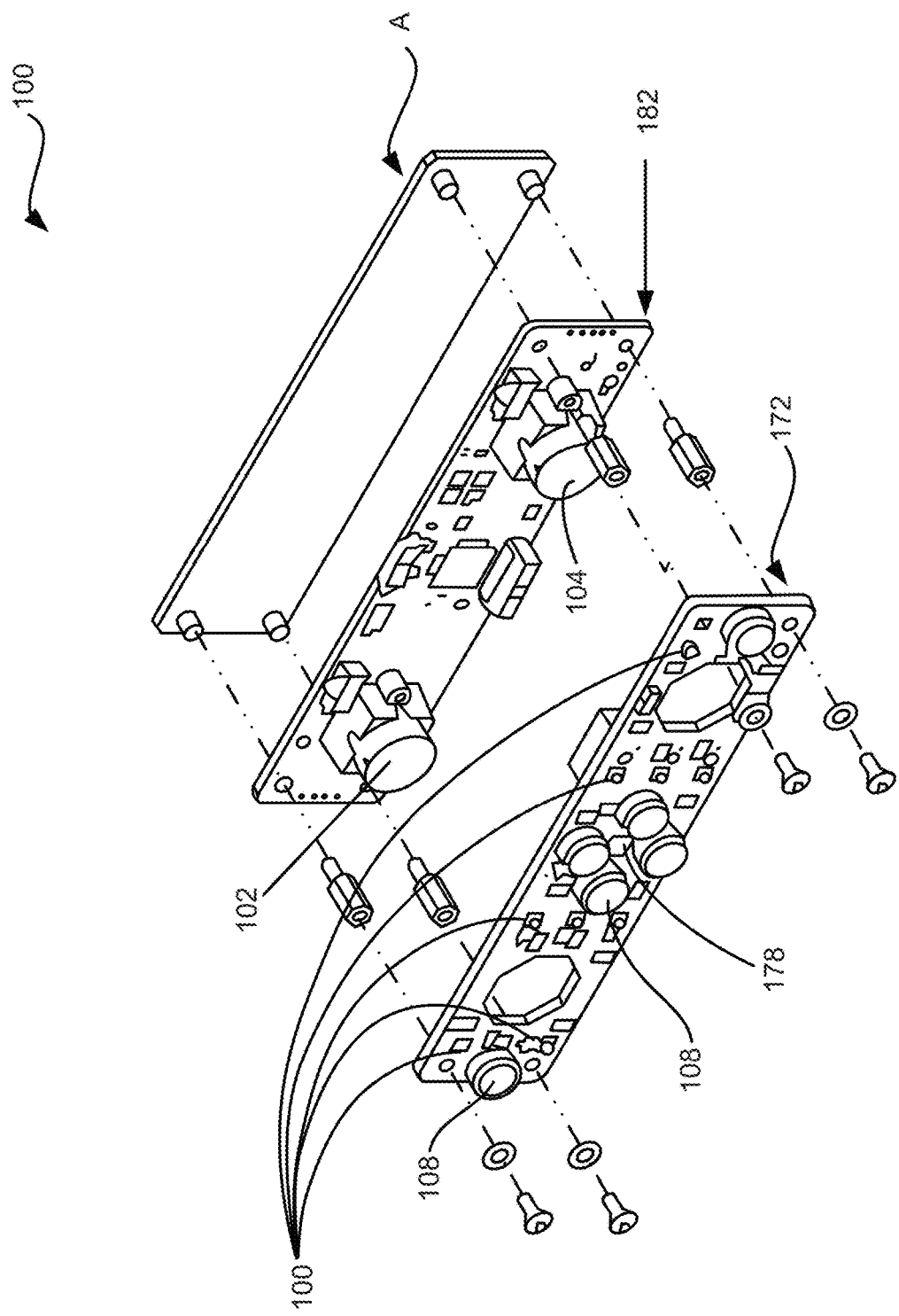
FIG. 1 shows an example motion sensory and imaging device.

FIG. 1 shows an example motion sensory device 100, which includes a main board 182 (first portion) coupleable to an illumination board 172 (second portion) with threaded fasteners or otherwise. Electrical interconnection between illumination board 172 and main board 182 permits exchange of signals and power flow and can be made by board mounted connectors, cabling or combinations thereof. One or more fasteners can fasten the device 100 to a mounting surface A of a host device (e.g., a vehicle (with or without a heads up display (HUD), an appliance or portable electronic device (such as a smartphone or tablet computer)

or a wearable device (such as a head mounted display (HMD), headsets, or the like) that interfaces with a vehicle or otherwise). The mounting surface A can be any surface (internal or external) of the host device. Alternatively, the device can be disposed within a cavity or receptacle of a host device using a friction fit, fasteners or any combination thereof. Device 100 can be embedded in any of a variety of equipment to meet design requirements of a wide variety of applications.

The illumination board 172 has a number of individually controllable illumination sources 108, 110, which can be LEDs or other sources, embedded thereon. Two cameras 102, 104 provide stereoscopic image-based sensing and reside on the main board 182 of device 100 in the illustrated implementation. The main board 182 may also include a processor conducting basic image processing, control of the cameras 102, 104 and the sources 108, 110.

Stereoscopic imaging information provided by cameras 102, 104 can be provided selectively or continuously to a user by means of a presentation device (HUD, dashboard/console mounted display device, wireless transmission to a display associated with a portable device, or a wearable appliance (HMD). The device 100 can provide live real time or near real time image information from the cameras, real time or near real time imaging information augmented by computer generated graphics, information, icons or other virtualized presentations, virtualized representations of the scene being viewed, and/or time varying combinations selected therefrom. Gestures made by a user are sensed by the cameras 102, 104 of the sensory device 100, and the resulting imaging information can be provided to a motion capture or image analysis system to identify and determine commands to a system. Advantageously, integrating scanning with imaging capabilities into a single motion sensory device 100 provides a highly functional, flexible, yet compact device suited to installation in machines with limited space, such as, e.g., vehicles, appliances, portable or wearable electronic devices, and so forth.

Some of the illumination sources 108, 110 can have associated focusing optics. In this example, six LEDs 108 (four of which are arranged at the center and two of which flank the board 172 at the sides) have focusing lenses, and ten additional LEDs 110 (which are arranged in columns of two, three, three, and two LEDs, respectively) are without focusing lenses. The board 172 may also include a socket 178 for coupling a photo-detector (or other sensor). Information from a photo-detector sensing changes in reflectance indicating presence or absence of objects within a region of space into which the illumination sources 108, 110 emit light during a "scanning" of the region of space.

Various modifications of the design shown in FIG. 1 are possible; for example the number and arrangement of LEDs, photo-detectors, and cameras may vary, the illumination and imaging hardware may be integrated on a single board, other modifications or combinations thereof depending upon the requirements of a particular application.

Figure 2:
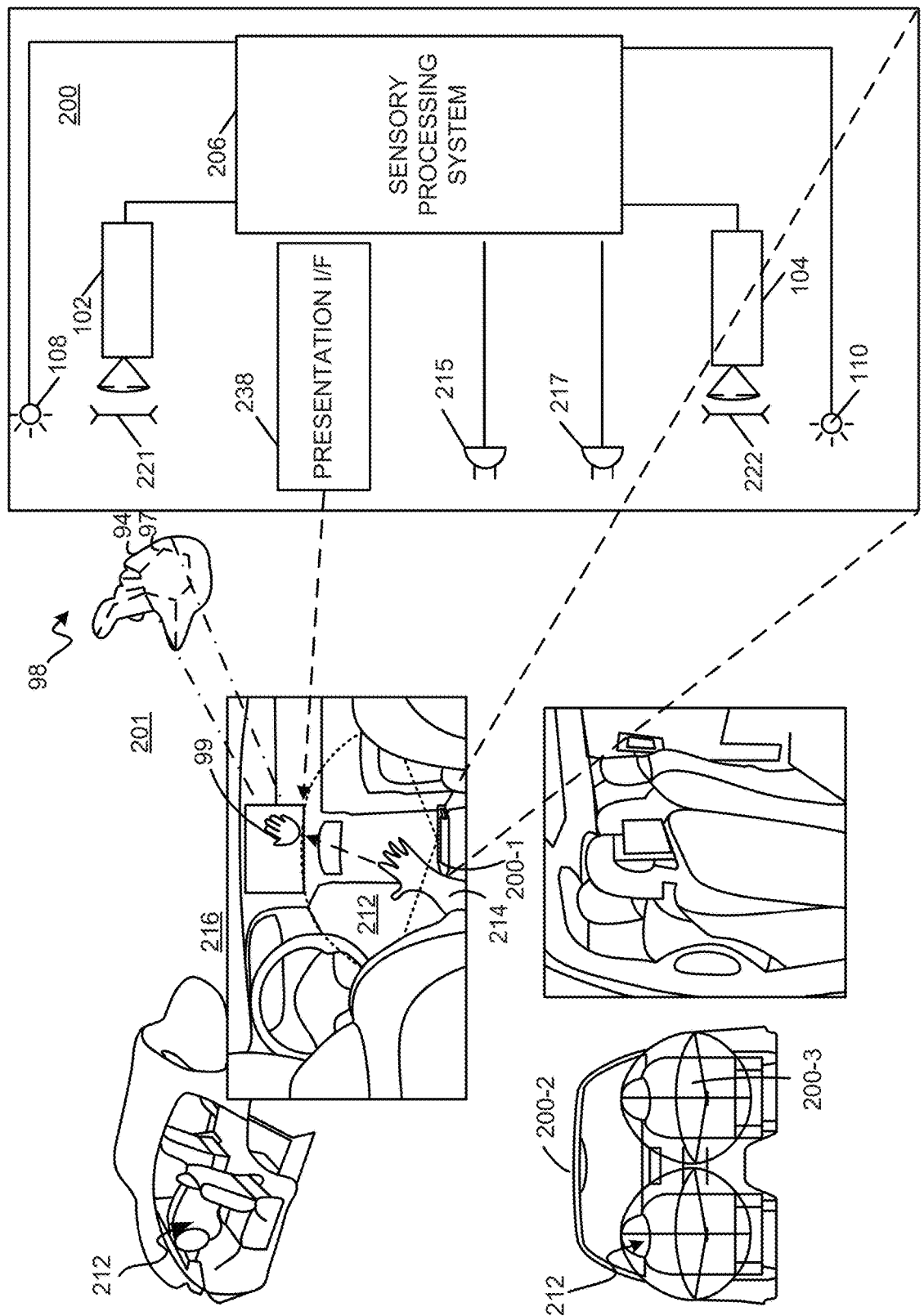
FIG. 2 shows an example sensory system based upon a motion sensory and imaging device.

Now with reference to FIG. 2, an example sensory system 200 deployed in an automobile cabin to recognize gestures is shown. System 200 is preferably implemented within a vehicle cabin 201 either in the front seat area, rear seat area, other placements or combinations. As shown in FIG. 2, all or portions of sensory system 200 can be affixed to or embedded within dashboard 216, console between front seat passengers, e.g., sensor 200-1, the cabin roof, e.g., sensor 200-2, the backs of the front seats, e.g., sensor 200-3, other locations, or combinations thereof. System 200 includes any number of cameras 102, 104 coupled to a sensory-analysis system 206. Cameras 102, 104 can be any type of camera, including cameras sensitive across the visible spectrum (e.g., red-green-blue or RGB) or, more typically, with enhanced sensitivity to a confined wavelength band (e.g., the infrared (IR) or ultraviolet (UV) bands) or combinations thereof; more generally, the term "camera" herein refers to any device (or combination of devices) capable of capturing an image of an object and representing that image in the form of digital data. While illustrated using an example of a two camera implementation, other implementations are readily achievable using different numbers of cameras or non-camera light sensitive image sensors or combinations thereof. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

In some implementations, sensory system 200 is capable of separating information received from pixels of cameras 102, 104 sensitive to IR light from information received from pixels sensitive to visible light, e.g., RGB (red, green, and blue) and processing these two types of image information separately. For example, IR (infrared) images can be used for gesture recognition while RGB (visible light) images can be used for a live video feed via a presentation interface. In this example, a video stream including a sequence of images of a scene in the real world can be captured using cameras having a set of RGB pixels and a set of IR pixels. Information from the IR sensitive pixels is separated out for processing to recognize gestures. Information from the RGB sensitive pixels is provided to a presentation interface (HUD, HMD, etc.) of a host device as a live video feed to a presentation output. The presentation output is displayed to a user. One or more virtual objects can be integrated with the video stream images to form the presentation output. Accordingly, the sensory system 200 can provide any of gesture recognition, a real world presentation of real world objects via pass through video feed, and/or an augmented reality including virtual objects integrated with a real world view.

Cameras 102, 104 are preferably capable of capturing video images (i.e., successive image frames at a constant rate of at least 15 frames per second); although no particular frame rate is required. The capabilities of cameras 102, 104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest can be defined as a cube approximately one meter on a side. In some implementations, as illustrated by sensor 200-1, the cameras 102, 104 are disposed opposite the motion to be detected, e.g., where the hand 214 is expected to move. In this location, the amount of information recorded about the hand is proportional to the number of pixels it occupies in the camera images, and the hand will occupy more pixels when the camera's angle with respect to the hand's "pointing direction" is as close to perpendicular as possible. In an alternative implementation, shown by sensor 200-3, the sensor is disposed along the motion detected, e.g., where the hand 214 is expected to move.

In some implementations, the one or more sources 108, 110 can be disposed to illuminate region of interest 212 in which one or more portions of the operator (or occupant's) body in this example a hand 214) that may optionally hold a tool or other object of interest and cameras 102, 104 are oriented toward the region 212 to capture video images of the hand 214. The operation of light sources 108, 110 and cameras 102, 104 is controlled by sensory-analysis system 206 which can be a computer system, control logic implemented in hardware and/or software or combinations thereof. Based on the captured images, sensory-analysis system 206 determines the position and/or motion of object 214.

In one implementation, the sources 108, 110 are infrared light sources. For example, the light sources can be, e.g., infrared light-emitting diodes (LEDs), and cameras 102, 104 can be sensitive to infrared light. Use of infrared light can allow the system 200 to operate under a broad range of lighting conditions and can avoid various inconveniences or distractions that may be associated with directing visible light into the region where the person is moving. However, a particular wavelength or region of the electromagnetic spectrum need not be required. In one implementation, filters 221, 222 are placed in front of cameras 102, 104 to filter out extraneous light so that only the light provided by sources 108, 110 is registered in the images captured by cameras 102, 104. In one implementation, the system selectively chooses to process visible (RGB) information or infrared (IR) information from cameras 102, 104 differently, separately or in conjunction with one another to adjust operation of system 200 to varying ambient conditions.

In another implementation, one or more sonic transducers 215, 217 are sonic sources sending sonic energy and detecting reflected sonic energy used in conjunction with, or instead of, cameras 102, 104 and light sources 108, 110. The sonic sources transmit sound waves to the user; the user either blocks (or "sonic shadowing") or alters the sound waves (or "sonic deflections") that impinge upon her. Such sonic shadows and/or deflections can also be used to detect the user's gestures and/or provide presence information and/or distance information using ranging techniques known in the art. In some implementations, the sound waves are, for example, ultrasound, that is not audible to humans. Alternatively, lasers or other radiation emitting devices can be used to detect position, presence or both of hand 214.

The illustrated system 200 can include any of various other sensors not shown in FIG. 2 for clarity, alone or in various combinations, to enhance the experience provided to the operator of vehicle 201. For example, in low-light situations where free-form gestures cannot be recognized optically with a sufficient degree of reliability, system 206 may switch to a touch mode in which touch gestures are recognized based on acoustic or vibrational sensors. Alternatively, system 206 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 206 from a standby mode to an operational mode. For example, the system 206 may enter the standby mode if optical signals from the cameras 102, 104 are absent for longer than a threshold interval.

It should be stressed that the arrangement shown in FIG. 2 is representative and not limiting. For example, lasers or other light sources can be used instead of LEDs. Visible light (RGB) can be used instead of infrared (IR) light. Further, information from one type of light source can be used to clarify, supplement, confirm or reject results from analyzing information gathered using a second type of light source. In implementations that include laser(s), additional optics (e.g., a lens or diffuser) may be employed to widen the laser beam (and make its field of view similar to that of the cameras). Useful arrangements can also include short- and wide-angle illuminators for different ranges. Light sources are typically diffuse rather than specular point sources; for example, packaged LEDs with light-spreading encapsulation are suitable.

Figure 3:
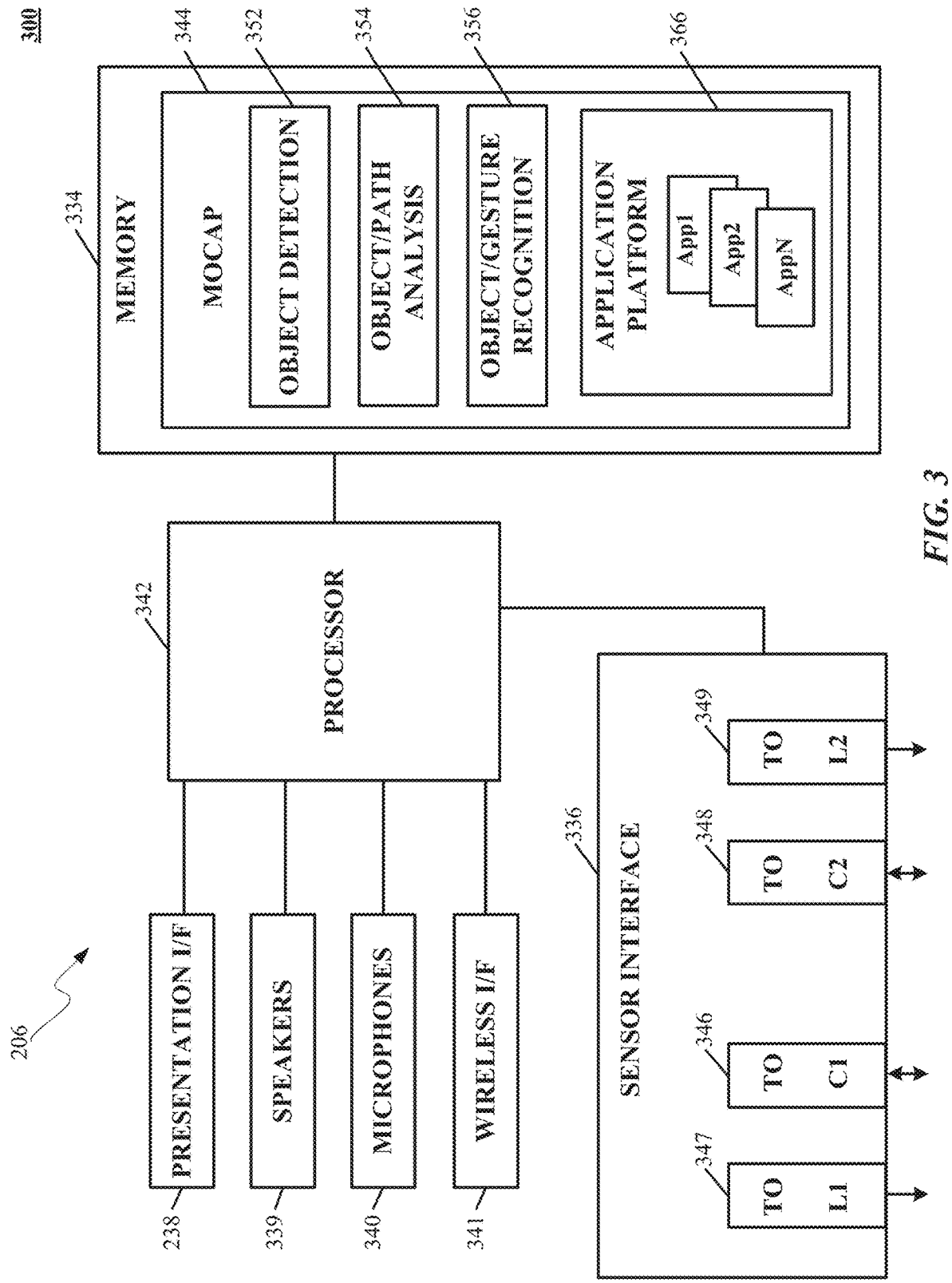
FIG. 3 shows a simplified block diagram of a computer system.

FIG. 3 is a simplified block diagram of a computer system 300, for implementing all or portions of sensory-analysis system 206 (also referred to as an image analyzer) according to an implementation of the technology disclosed. Sensory-analysis system 206 can include or consist of any device or device component that is capable of capturing and processing image data. In some implementations, computer system 300 includes a processor 342, memory 334, a sensor interface 336, a presentation I/F 238 which can include a display or other presentation mechanism(s), (e.g. holographic projection systems, heads up displays (HUDs), wearable googles or other head mounted displays (HMDs) for occupant/rear seat implantations, other visual presentation mechanisms or combinations thereof), speakers 339, an microphones 340, and an optional wireless interface 341. Memory 334 can be used to store instructions to be executed by processor 342 as well as input and/or output data associated with execution of the instructions. In particular, memory 334 contains instructions, conceptually illustrated as a group of modules described in greater detail below, that control the operation of processor 342 and its interaction with the other hardware components. An operating system directs the execution of low-level, basic system functions such as memory allocation, file management and operation of mass storage devices. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MAC OS operating system, the APACHE operating system, an OPEN-ACTION operating system, iOS, Android or other mobile operating systems, or another operating system or platform.

The computing environment can also include other removable/non-removable, volatile/nonvolatile computer storage media. For example, a hard disk drive can read or write to non-removable, nonvolatile magnetic media. A magnetic disk drive can read from or write to a removable, nonvolatile magnetic disk, and an optical disk drive can read from or write to a removable, nonvolatile optical disk such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Processor 342 can be a general-purpose microprocessor, but depending on implementation can alternatively be a microcontroller, peripheral integrated circuit element, a CSIC (customer-specific integrated circuit), an ASIC (application-specific integrated circuit), a logic circuit, a digital signal processor, a programmable logic device such as an FPGA (field-programmable gate array), a PLD (programmable logic device), a PLA (programmable logic array), an RFID processor, smart chip, or any other device or arrangement of devices that is capable of implementing the actions of the processes of the technology disclosed.

Sensor interface 336 can include hardware, firmware and/or software that enables communication between computer system 300 and cameras 102, 104 shown in FIG. 1, as well as associated light sources 108, 110. Thus, for example, sensor interface 336 can include one or more data ports 346, 348 to which cameras 102, 104 can be connected, as well as hardware, firmware and/or software signal processors to modify data signals received from the cameras (e.g., to reduce noise or reformat data) prior to providing the signals as inputs to a motion-capture ("mocap") program 344 executing on processor 342. In some implementations, sensor interface 336 can also transmit signals to the cameras, e.g., to activate or deactivate the cameras, to control camera settings (frame rate, image quality, sensitivity, etc.), and/or other optional sensors to control sensor settings (calibration, sensitivity levels, etc.), or the like. Such signals can be transmitted, e.g., in response to control signals from processor 342, which can in turn be generated in response to user input or other detected events.

Sensor interface 336 can also include controllers 347, 349, to which light sources (e.g., light sources 108, 110) can be connected. In some implementations, controllers 347, 349 provide operating current to the light sources, e.g., in response to instructions from processor 342 executing mocap program 344. In other implementations, the light sources can draw operating current from an external power supply, and controllers 347, 349 can generate control signals for the light sources, e.g., instructing the light sources to be turned on or off or changing the brightness. In some implementations, a single controller can be used to control multiple light sources.

Instructions defining mocap program 344 are stored in memory 334, and these instructions, when executed, perform motion-capture analysis on images supplied from cameras connected to sensor interface 336. In one implementation, mocap program 344 includes various modules, such as an object detection module 352, an object analysis module 354, and a gesture-recognition module 356. Object detection module 352 can analyze images (e.g., images captured via sensor interface 336) to detect edges of an object therein and/or other information about the object's location. Object analysis module 354 can analyze the object information provided by object detection module 352 to determine the 3D position and/or motion of the object (e.g., a user's hand). In some implementations, object analysis module 354 can also analyze audio signals (e.g., audio signals captured via interface 336) to localize the object by, for example, time distance of arrival, multilateration or the like. ("Multilateration is a navigation technique based on the measurement of the difference in distance to two or more stations at known locations that broadcast signals at known times. See Wikipedia, at http://en.wikipedia.org/w/index.php?title=Multilateration&oldid=523281858, on Nov. 16, 2012, 06:07 UTC). Examples of operations that can be implemented in code modules of mocap program 344 are described below. Memory 334 can also include other information and/or code modules used by mocap program 344 such as an application platform 366 that allows a user to interact with the mocap program 344 using different applications like application 1 (App1), application 2 (App2), and application N (AppN).

Presentation I/F 238, speakers 339, microphones 340, and optional wireless interface 341 can be used to facilitate user or system interaction with computer system 300. In some implementations, results of gesture capture using sensor interface 336 and mocap program 344 can be interpreted as user input. For example, a user can perform hand gestures that are analyzed using mocap program 344, and the results of this analysis can be interpreted as an instruction to some other program executing on processor 342 (e.g., a web browser, GPS application, dictation program, or other application). Thus, by way of illustration, a user might use upward or downward swiping gestures to "scroll" a webpage currently displayed via presentation I/F 238, to use rotating gestures to increase or decrease the volume of audio output from speakers 339, and so on.

It will be appreciated that computer system 300 is illustrative and that variations and modifications are possible. A particular implementation can include other functionality not described herein, e.g., wired and/or wireless network interfaces, media playing and/or recording system interfaces, etc. In some implementations, one or more cameras can be built into the vehicle or equipment into which the sensor 200 is imbedded rather than being supplied as separate components. Further, an image analyzer can be implemented using only a subset of computer system components (e.g., as a processor executing program code, an ASIC, or a fixed-function digital signal processor, with suitable I/O interfaces to receive image data and output analysis results).

While computer system 300 is described herein with reference to particular blocks, it is to be understood that the blocks are defined for convenience of description and are not intended to imply a particular physical arrangement of component parts. Further, the blocks need not correspond to physically distinct components. To the extent that physically distinct components are used, connections between components (e.g., for data communication) can be wired and/or wireless as desired.

With reference to FIGS. 2 and 3, the user (e.g., vehicle operator, occupant(s)) performs a gesture that is captured by the cameras 102, 104 as a series of temporally sequential images. In other implementations, cameras 102, 104 can capture any observable pose or portion of a user. For instance, if a user places a large portion of their body into the field of view near the cameras 102, 104, cameras 102, 104 can capture not only the intended hand gestures, but the whole body of the user can be within the field of view of the cameras. Motions of the hand 214 can be distinguished by object analysis module 354 and analyzed by a gesture-recognition module 356, of the mocap 344. Gesture-recognition module 356 provides input to one or more systems or subsystems of the vehicle or other controlled equipment, allowing a user to remotely control those systems or subsystems and/or virtually manipulate objects, such as virtualized gauges, indicators, buttons, levers, or other controls, in a virtual environment displayed via presentation I/F 238. The user can perform the gesture using any part of her body, such as a finger, a hand, or an arm or combinations thereof. As part of gesture recognition or independently, the sensory-analysis system 206 can determine the shapes and positions of the user's hand in 3D space and in real time using algorithms described below as well as, in more detail, in, e.g., U.S. Ser. Nos. 61/587,554, 13/414,485, 61/724,091, 13/724,357, and 13/742,953, filed on Jan. 17, 2012, Mar. 7, 2012, Nov. 8, 2012, Dec. 21, 2012 and Jan. 16, 2013, respectively, the entire disclosures of which are hereby incorporated by reference.

As a result, the sensory-analysis system 206 can not only recognize gestures for purposes of providing input to the electronic device, but can also capture the position and shape of the user's hand in consecutive video images in order to characterize the hand gesture in 3D space and reproduce it on a display screen for example via presentation I/F 238 as a rigged hand 99 for example. Rigged hand 99 is determined from model hand 98 that includes a rigged hand overlay 94 covering one or more capsule elements 97 built from the images by the object detection module 352.

Figure 5:
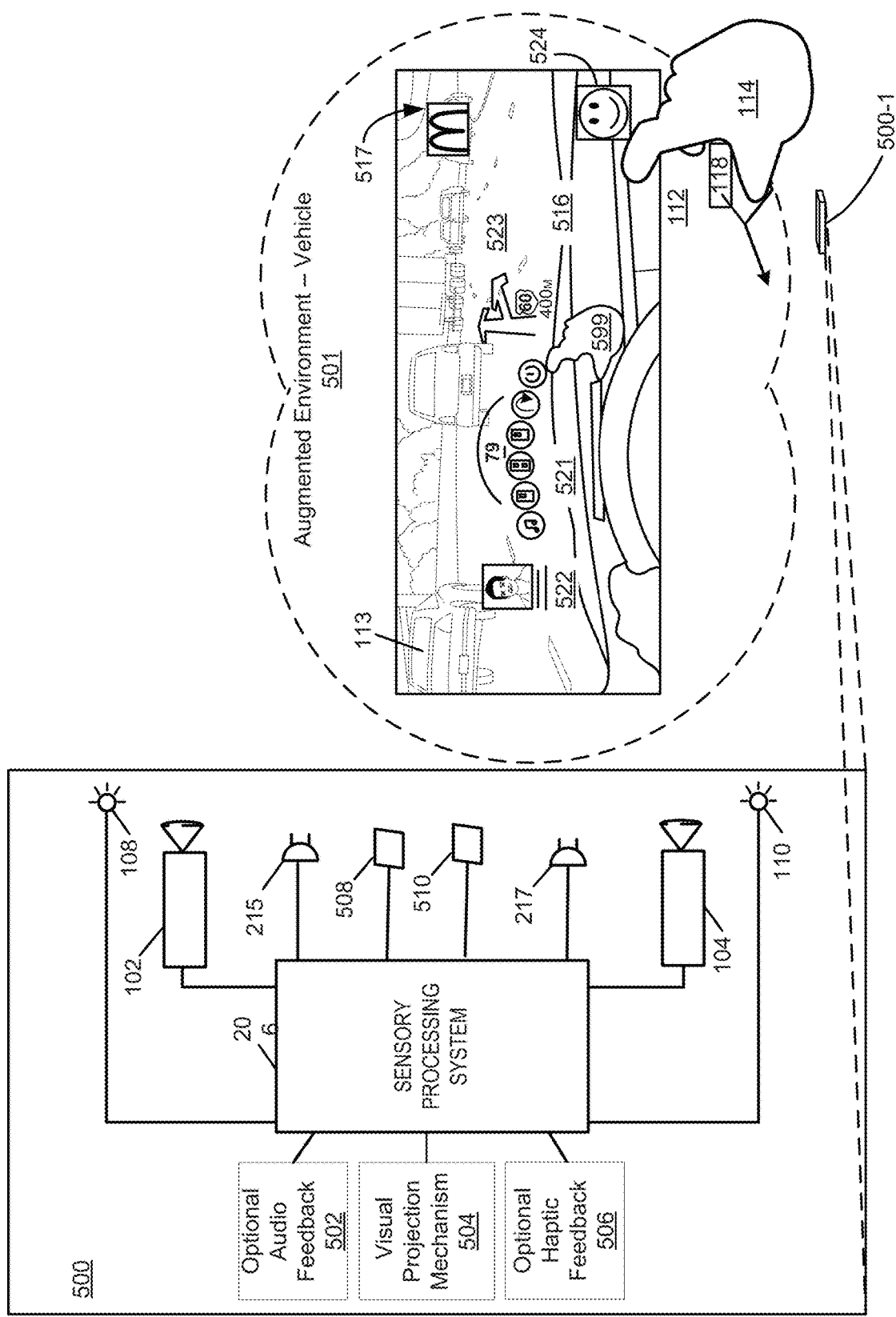
FIG. 5 shows an example augmented reality presented by a motion sensory and imaging capable device.

In one implementation, and with reference to FIG. 5, a rigged hand representation 599 can be projected as part of an augmented vehicle environment onto a (semi-)transparent or other surface through which one or more real objects can be viewed also, e.g., a windshield 516 according to one implementation of the technology disclosed. For example, with continuing reference to FIG. 5, a video projector 504, coupled to presentation I/F 238, can project an image of an arrow (e.g., virtual device 523) from a GPS application superimposed upon a (semi-) transparent surface, e.g., windshield 516, being viewed directly by the user (or displayed to a user via live video feed in the event the operator is remote (e.g., operating a drone or a driverless vehicle) from the vehicle or the vehicle lacks a windshield); thereby creating an augmented environment experience when operating the vehicle. Optional haptic projector 506 can project the feeling of the pressure of clicking or pressing a physical control. Optional audio projector 502 can project the sounds of virtual "speed bumps" indicating the driver of a car should pay attention to the change in route, an oncoming obstacle or the speed of the vehicle.

In one implementation, the gesture-recognition module 356 compares one or more primitives of the detected gesture to a library of gesture primitives electronically stored as records in a database, which is implemented in the sensory-analysis system 206, the electronic device, or on an external storage system. (As used herein, the term "electronically stored" includes storage in volatile or non-volatile storage, the latter including disks, Flash memory, etc., and extends to any computationally addressable storage media (including, for example, optical storage).) For example, gestures can be stored as vectors, i.e., mathematically specified spatial trajectories, other primitives or combinations thereof, and the gesture record can have a field specifying the relevant part of the user's body making the gesture; thus, similar trajectories executed by a user's hand and head can be stored in the database as different gestures so that an application can interpret them differently.

Figure 4:
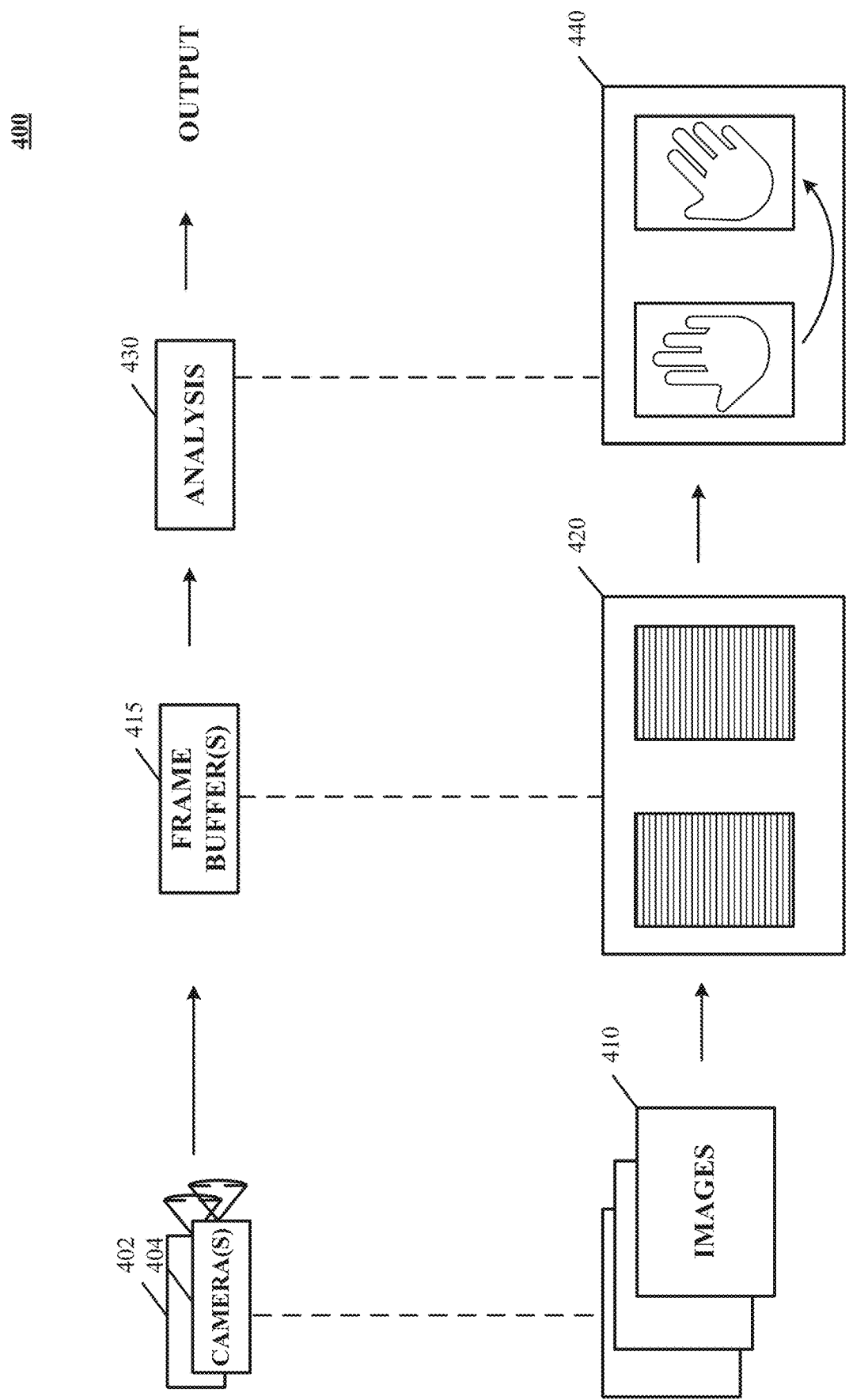
FIG. 4 shows basic operations and functional units involved in motion capture and image analysis.

FIG. 4 depicts the basic operations and functional units 400 involved in motion capture and image analysis in accordance with implementations of the technology disclosed. As shown in FIG. 4, the camera(s) 402, 404 record digital images 410 of a scene. Each digital image is captured as an array of pixel values by the associated camera's image sensor, and the digital images are transferred—either in "raw" format or following conventional preprocessing—to one or more frame buffers 415. A frame buffer is a partition or dedicated segment of volatile memory that stores a "bitmapped" image frame 420 corresponding to the pixel values of an image as output by the camera that recorded it. The bitmap is generally organized conceptually as a grid, with each pixel mapped one-to-one or otherwise to output elements of a display. It should be stressed, however, that the topology of how memory cells are physically organized within the frame buffers 415 does not matter and need not conform directly to the conceptual organization.

The number of frame buffers included in a system generally reflects the number of images simultaneously analyzed by the analysis system or module 430, which is described in greater detail below. Briefly, analysis module 430 analyzes the pixel data in each of a sequence of image frames 420 to locate objects therein and track their movement over time (as indicated at 440). This analysis can take various forms, and the algorithm performing the analysis dictates how pixels in the image frames 420 are handled. For example, the algorithm implemented by analysis module 430 can process the pixels of each frame buffer on a line-by-line basis—i.e., each row of the pixel grid is successively analyzed. Other algorithms can analyze pixels in columns, tiled areas, or other organizational formats.

In various implementations, the motion captured in a series of camera images is used to compute a corresponding series of output images for display via the presentation I/F 238. For example, camera images of a moving hand can be translated into a wire-frame or other graphic depiction of the hand by the processor 342. Alternatively, hand gestures can be interpreted as input used to control a separate visual output; by way of illustration, a user can be able to use upward or downward swiping gestures to "scroll" a webpage or other document currently displayed, or open and close her hand to zoom in and out of the page. In any case, the output images are generally stored in the form of pixel data in a frame buffer, e.g., one of the frame buffers 415. A video display controller reads out the frame buffer to generate a data stream and associated control signals to output the images via the presentation I/F 238. The video display controller can be provided along with the processor 342 and memory 334 on-board the motherboard of the computer 300, and can be integrated with the processor 342 or implemented as a co-processor that manipulates a separate video memory. As noted, the computer 300 can be equipped with a separate graphics or video card that aids with generating the feed of output images for the presentation I/F 238. The video card generally includes a graphics processing unit (GPU) and video memory, and is useful, in particular, for complex and computationally expensive image processing and rendering. The graphics card can include the frame buffer and the functionality of the video display controller (and the on-board video display controller can be disabled). In general, the image-processing and motion-capture functionality of the system can be distributed between the GPU and the main processor 342 in various ways.

Suitable algorithms for motion-capture program 344 are described below as well as, in more detail, in U.S. Ser. Nos. 61/587,554, 13/414,485, 61/724,091, 13/724,357, and 13/742,953, filed on Jan. 17, 2012, Mar. 7, 2012, Nov. 8, 2012, Dec. 21, 2012 and Jan. 16, 2013, respectively, which are hereby incorporated herein by reference in their entirety. The various modules can be programmed in any suitable programming language, including, without limitation high-level languages such as C, C++, C#, OpenGL, Ada, Basic, Cobra, FORTRAN, Java, Lisp, Perl, Python, Ruby, or Object Pascal, or low-level assembly languages.

Again with reference to FIG. 4, the modes of operation of a device equipped with a motion sensory control device can determine the coarseness of the data provided to the image-analysis module 430, the coarseness of its analysis, or both in accordance with entries in a performance database. For example, during a wide-area mode of operation, the image-analysis module 430 can operate on every image frame and on all data within a frame, capacity limitations can dictate analysis of a reduced amount of image data per frame (i.e., resolution) or discarding of some frames altogether if the data in each of the frame buffers 415 are organized as a sequence of data lines. The manner in which data is dropped from the analysis can depend on the image-analysis algorithm or the uses to which the motion-capture output is put.

In some implementations, data is dropped in a symmetric or uniform fashion—e.g., every other line, every third line, etc. is discarded up to a tolerance limit of the image-analysis algorithm or an application utilizing its output. In other implementations, the frequency of line dropping can increase toward the edges of the frame. Still other image-acquisition parameters that can be varied include the frame size, the frame resolution, and the number of frames acquired per second. In particular, the frame size can be reduced by, e.g., discarding edge pixels or by resampling to a lower resolution (and utilizing only a portion of the frame buffer capacity). Parameters relevant to acquisition of image data (e.g., size and frame rate and characteristics) are collectively referred to as "acquisition parameters," while parameters relevant to operation of the image-analysis module 430 (e.g., in defining the contour of an object) are collectively referred to as "image-analysis parameters." The foregoing examples of acquisition parameters and image-analysis parameters are representative only, and not limiting.

Acquisition parameters can be applied to the cameras 402, 404 and/or to the frame buffers 415. The camera 402, 404 for example, can be responsive to acquisition parameters in operating the cameras 402, 404 to acquire images at a commanded rate, or can instead limit the number of acquired frames passed (per unit time) to the frame buffers 415. Image-analysis parameters can be applied to the image-analysis module 430 as numerical quantities that affect the operation of the contour-defining algorithm.

The desirable values for acquisition parameters and image-analysis parameters appropriate to a given level of available resources can depend, for example, on the characteristics of the image-analysis module 430, the nature of the application utilizing the mocap output, and design preferences. Whereas some image-processing algorithms can be able to trade off a resolution of contour approximation against input frame resolution over a wide range, other algorithms may not exhibit much tolerance at all—requiring, for example, a minimal image resolution below which the algorithm fails altogether.

In one implementation, and with reference to FIG. 5, which illustrates a system 500 for projecting an augmented vehicle environment 501 onto a (semi-)transparent or other surface through which one or more real objects can be viewed also, e.g., a windshield 516 according to one implementation of the technology disclosed. System 500 includes a sensory processing system 206 controlling a variety of sensors and projectors, such as for example one or more cameras 102, 104 (or other image sensors) and optionally some illumination sources 108, 110 comprising an imaging system. Optionally, a plurality of vibrational (or acoustical) sensors 508, 510 positioned for sensing contacts with surface (e.g., a touch screen display or the like not shown in FIG. 5 for clarity sake) can be included. Optionally projectors under control of system 206 can render virtual objects to provide the augmented vehicle environment 501, such as an optional audio projector 502 to provide audio feedback (e.g., "clicks", chimes, speech feedback when virtual buttons are pressed or virtual controls are manipulated), optional video projector 504, an optional haptic projector 506 to provide haptic feedback (e.g., button pressure, pressure indicating a physical object has been grasped, etc.) to a user of augmented vehicle environment 501. For further information on projectors, reference may be had to "Visio-Tactile Projector" Youtube (https://www.youtube.com/watch?v=Bb0hNMxxewg) (accessed Jan. 15, 2014). In operation, sensors and projectors of system 500 can be incorporated wholly or partly into sensor device 500-1, or otherwise conveniently disposed toward a region of interest 112 in order to sense motion and presence of hand 114, that moves along the indicated path 118 to give commands to the system 500 by gesturing. One or more applications 522, 523 can be provided as virtual objects integrated into the display of the augmented reality 113. Accordingly, user (e.g., owner of hand 114) is able to view real objects e.g., through windshield 516, outputs of applications 521, 522 virtualized into the augmented reality 113, in the same environment 501.

Projection can include an image or other visual representation of the user's hand 599 and/or one or more optional objects. Objects can include (e.g., objects associated with an application 522, 523, 524 objects representing an operational parameter of the vehicle 521, advertising objects 517, objects representing more abstract things 515, other types of objects, and combination objects). For example, visual projection mechanism 504 of FIG. 5 can project an icon 522 of a person from the operator's contact list. A GPS application can plan route to the selected location for the person in the contact list and provide guidance information 523, also projected as virtualized objects into augmented vehicle environment 501, to the operator. Various objects 521 associated with status monitors provide information about the vehicle's systems. An advertising application searches previous destinations of trips made in close proximity to previous trips to visit contact 522 and displays an appropriate advertising object 517. For example, if the operator visits a friend (contact 522) and they've gone to Burger King the last three times, an advertising icon for McDonalds may appear. A vehicle "happiness" icon 524 displays an overall level of happiness of the occupants determined from a variety of parameters (e.g., frequency of changes in environmental controls, frequency of change in entertainment selections, amounts of ambient light, temperature, humidity, etc.).

Alternatively, surface 516 can be a wearable computing device such as Google Glass™ or equivalent connectable wirelessly or by wire to sensory system 500.

Projections for augmented vehicle environments can be differentiated for front and rear seat passengers in an automobile for example. Front seat passengers can experience clicks, chimes and/or speech feedback responsive to the occupant's gestures. Rear seat passengers can experience clicks, chimes and/or speech feedback on separate audio channel to headphones or HMDs used by the rear seat passengers (to avoid distracting driver).

Alternatively, in a driverless automobile implementation, the "driver" no longer drives vehicle. There is not as significant a price for distracting the "driver". In one such implementation, gestures can be expanded for all front seat passengers to control vehicle (sub)systems. Driverless vehicles can include a larger more interactive HUD (up to whole windshield). Gestures control non-safety related navigation decisions (e.g., override determined routing, waypoints on moving map display, choosing rest stops for purposes of rerouting (e.g., bathroom breaks), and so forth).

The invention claimed is:

1. An embeddable motion sensory control device, including:
   a controller coupled to imaging sensors, sonic transducers, and one or more illumination sources to control operation thereof, the controller being configured to acquire imaging information and sonic information of a scene directly reflected, by a hand of an occupant of a vehicle in the scene, to the imaging sensors and the sonic transducers, and providing at least a near real time stream of the imaging information and sonic information of the scene to the vehicle;

one or more fasteners that fasten the imaging sensors and the one or more illumination sources to a mounting surface of the vehicle; and wherein the controller is further configured to interact with an augmented reality system providing a heads up display (HUD) on a windshield of the vehicle, such that a graphical object representing the hand of the occupant is displayed by the HUD onto the windshield and the graphical object is capable of interacting with other objects displayed by the HUD as a result of movement of the hand of the occupant, and wherein the controller is further configured to determine an overall level of happiness of occupants of the vehicle according to at least a frequency of changes in environmental controls of the vehicle, wherein the controller is further configured to select an icon that illustrates facial features inherently representing the determined overall level of happiness, wherein the controller is further configured to interact with the augmented reality system to display an augmented reality presentation by the HUD onto the windshield including the selected icon, such that a driver of the vehicle is informed of the overall level of happiness of other occupants of the vehicle, and wherein the changes in environmental controls of the vehicle include changes in the control of the temperature of the vehicle.

2. The device of claim 1, wherein the controller further provides:
capturing imaging information for control objects within view of the imaging sensors; wherein the imaging information for control objects of interest is used to determine gesture information indicating a command to a machine under control.

3. The device of claim 2, wherein the capturing further includes:
separating information received from pixels sensitive to IR light from information received from pixels sensitive to visible light;
processing image information from IR sensors to be used for gesture recognition; and
processing image information from RGB sensors to be provided as a video feed via a presentation interface.

4. The device of claim 3, wherein the processing of the image information from RGB sensors further includes:
extracting features of a region of interest using RGB pixels that respectively capture red, green, and blue components of illumination in the scene.

5. The device of claim 3, wherein the processing of the image information from IR sensors further includes:
extracting features of a region of interest using IR pixels that capture infrared components of illumination in the scene.

6. The device of claim 1, further including:
a port to receive information from a photo-detector sensing changes in reflectance indicating presence or absence of objects within a region of space into which the illumination sources emit light.

7. The device of claim 1,
wherein the controller is configured to interact with the augmented reality system to present a presentation interface displaying an augmented reality presentation by the HUD onto the windshield, wherein the presentation interface is produced, in part, from images captured by the imaging sensors.

8. The device of claim 7, wherein the augmented reality presentation further includes a sequence of images of a scene with computer generated information.

9. The device of claim 8, wherein the controller is further configured to:
determine destination information from at least one image of the sequence of images and information entered or used by an operator;
select an icon representing an advertisement relevant to the destination information; and
interact with the augmented reality system to display the icon representing the advertisement in the augmented reality presentation by the HUD onto the windshield.

10. The device of claim 1, wherein the hand of the occupant is imaged in changing and uncontrollable lighting situations, background objects, glare, and reflections.

11. The device of claim 1, wherein the embedded motion sensory control device further includes a vehicle-mounted haptic projector that projects sensations to the hand of the occupant while making a gesture and without the hand of the occupant touching a surface of the vehicle.

12. The device of claim 1, wherein, in conjunction with the imaging sensors, the sonic transducers provide presence information or distance information regarding the occupant.

13. An embeddable motion sensory control device, including:
a controller coupled to imaging sensors, sonic transducers, and one or more illumination sources to control operation thereof, the controller being configured to acquire imaging information and sonic information of a scene directly reflected, by a hand of an occupant of a vehicle in the scene, to the imaging sensors and the sonic transducers, and providing at least a near real time stream of the imaging information and sonic information of the scene to the vehicle;
one or more fasteners that fasten the imaging sensors and the one or more illumination sources to a mounting surface of the vehicle; and
wherein the controller is further configured to interact with an augmented reality system providing a heads up display (HUD) on a windshield of the vehicle, such that a graphical object representing the hand of the occupant is displayed by the HUD onto the windshield and the graphical object is capable of interacting with other objects displayed by the HUD as a result of movement of the hand of the occupant,
wherein the controller is further configured to determine an overall level of happiness of occupants of the vehicle according to at least a frequency of changes in environmental controls of the vehicle,
wherein the controller is further configured to select an icon that illustrates facial features inherently representing the determined overall level of happiness,
wherein the controller is further configured to interact with the augmented reality system to display an augmented reality presentation by the HUD onto the windshield including the selected icon, such that a driver of the vehicle is informed of the overall level of happiness of other occupants of the vehicle, and
wherein the changes in environmental controls of the vehicle include changes in the control of the amount of ambient light of the vehicle.

* * * * *